United States Patent [19]
Luongo et al.

[11] 4,149,386
[45] Apr. 17, 1979

[54] SYSTEM TO CONTROL LOW PRESSURE TURBINE TEMPERATURES

[75] Inventors: Michael C. Luongo, Brookhaven; Stephen P. Glaudel, Penn Hills Township, Allegheny County; Donald N. Tapper, Media, all of Pa.

[73] Assignee: Westinghouse Electric Corp., Pittsburgh, Pa.

[21] Appl. No.: 741,437

[22] Filed: Nov. 12, 1976

[51] Int. Cl.² .............................................. F01K 7/22
[52] U.S. Cl. ......................................... 60/663; 60/680
[58] Field of Search .......... 60/647, 652, 653, 656–657, 60/660–663, 679, 680; 290/40 R, 2

[56] References Cited

U.S. PATENT DOCUMENTS

| 3,359,732 | 12/1967 | Schuetzenduebel et al. | 60/646 |
|---|---|---|---|
| 3,588,265 | 6/1971 | Berry | 290/2 |
| 3,792,583 | 2/1974 | Luongo et al. | 60/660 |

FOREIGN PATENT DOCUMENTS 936851  9/1963  United Kingdom ...................... 60/663

Primary Examiner—Allen M. Ostrager
Assistant Examiner—Stephen F. Husar
Attorney, Agent, or Firm—W. E. Zitelli

[57] ABSTRACT

An electronic system for operating a nuclear steam turbine power plant including a cycle steam reheater controller to control the heat transfer operation in a cycle steam reheater according to the steam and metal temperatures measured in one or more low pressure turbine sections, is disclosed. The steam and metal temperatures are closed-loop controlled as a function of the low pressure turbine design operational limitations. The reheater controller controls dual reheaters, each employing one or more heating sections which reheat cycle steam flowing therethrough to one or more low pressure turbine sections with split side entry steam inlet ports.

29 Claims, 7 Drawing Figures

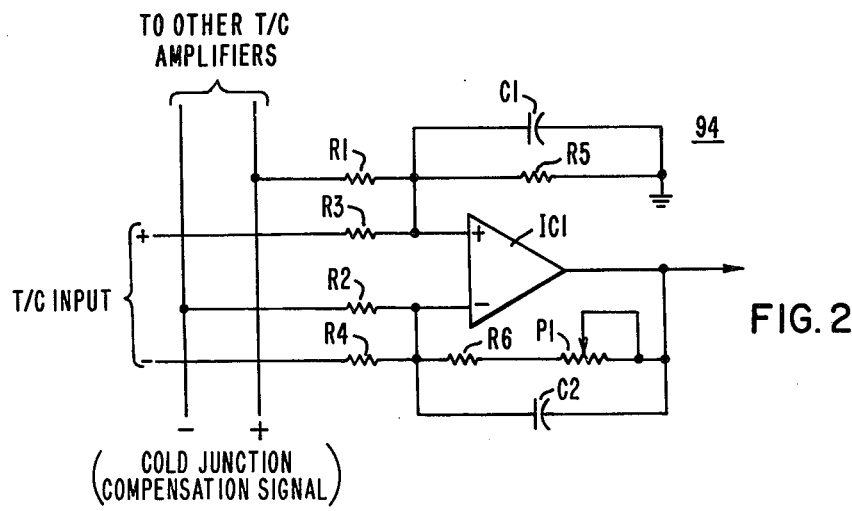
FIG. 2
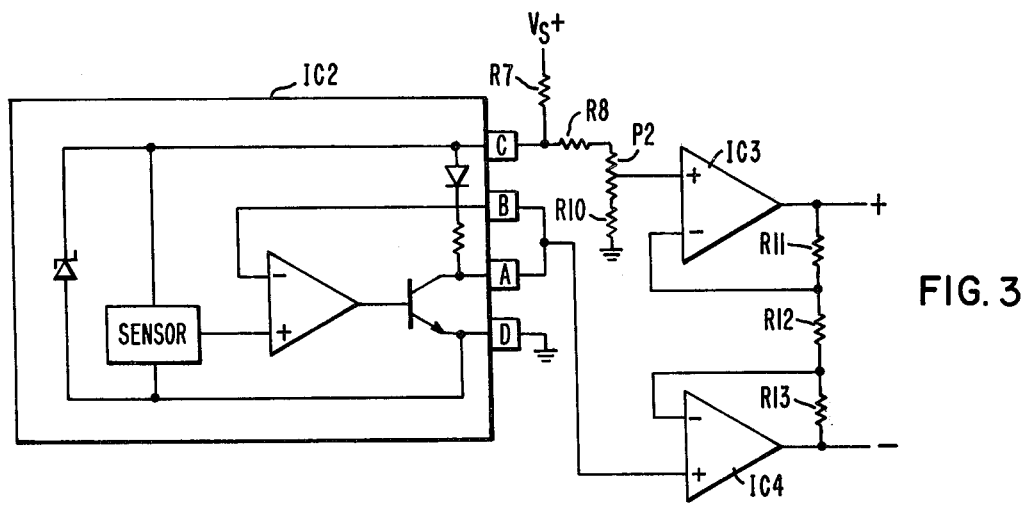
FIG. 3
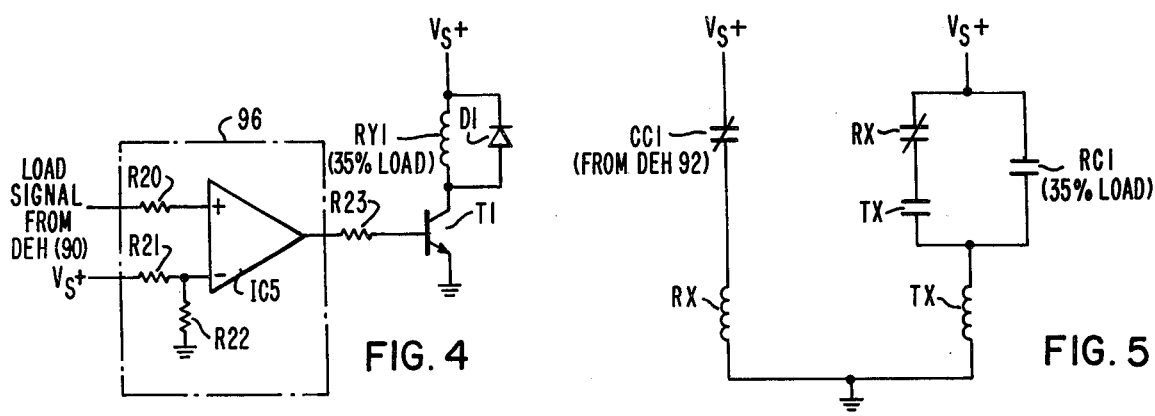
FIG. 4
FIG. 5

SYSTEM TO CONTROL LOW PRESSURE TURBINE TEMPERATURES

BACKGROUND OF THE INVENTION

1. Field of the Invention

The present invention relates to a steam turbine nuclear power plant and more particularly to the control of LP turbine cycle steam and metal temperatures by governing the heat transfer operation in a moisture separator-reheater.

2. Description of the Prior Art

The temperatures and pressures of the cycle steam in the main steam header (MSH) of a nuclear steam supply system (NSSS) are considerably lower than that of fossil steam systems. The energy in the steam supplied to the high pressure (HP) turbine in a nuclear plant is just about enough to evaporate water. Theoretical heat rate calculations, have determined that at approximately 35% of rated turbine cycle steam flow, saturated (wet) steam conditions will exist at the exhaust of the HP turbine. Since the cycle steam is further needed to transmit energy to the one or more downstream low pressure (LP) turbines, a moisture separator-reheater (MSR) unit is provided as part of the nuclear steam turbine supply package to remove the moisture content and reheat the HP exhaust steam to dry conditions. Heating steam is usually supplied to the reheater from a hot steam supply source, generally the MSH. Typically, the heat transfer control of the MSR's has been performed by governing the flow of the heating steam through tube bundles located within the MSR in accordance with a set of control modes. One such MSR controller presently in use is described in U.S. Pat. No. 3,898,842, "Electric Power Plant System And Method For Operating A Steam Turbine Especially Of The Nuclear Type With Electronic Reheat Control Of A Cycle Steam Reheater" by M. Luongo, issued Aug. 12, 1975, which is referred to herein for a better understanding of MSR control and nuclear turbine cycle steam operational limitations.

In the control of reheating cycle steam, the operational limitations of the downstream LP turbine must be considered. For example, protection must be provided to guard against rapid heating or cooling of turbine parts in order to avoid excessive distortion and thermal-fatigue cracking thereof. In addition, at low loads, it becomes necessary to reduce the steam temperature at the LP turbine inlet to protect against overheating and subsequent overstressing the last two rows of rotating LP turbine blading. The MSR controller described in the previously mentioned U.S. Pat. No. 3,898,842 provides a set of operating modes for protection of the downstream LP turbine according to the foregoing criteria. The operating of such controller modes may be selected by a power plant operator or a programmed power plant computer in accordance with the state of the turbine process as exhibited to either the operator or the plant computer. Certain sequencing of operational modes entails knowledge of prior and existing turbine states. As a result, judgment of the turbine conditions and decision in determining control operations are left entirely to the operator or the plant computer. In either case, the MSR operational mode selection is most likely to occur in time concurrent with other equally necessary decision making control functions, thus burdening the responsible party. It is one object of the invention, then, to alleviate the burdens of MSR control by providing a MSR controller which functions autonomously.

To better appreciate the control of the MSR, one must understand the operation of the surrounding process effecting such a control. Heat transfer within a typical MSR is based primarily on temperature and flow of the heating steam and the temperature and flow of the cycle steam. The heating steam flow to one such MSR is governed typically by a control valve as a function of a generated reference temperature set point. It is preferred in MSR control that the temperature at the LP turbine inlet increase linearly as a function of load during load ramp conditions. However, in an NSSS, the MSH temperature and likewise pressure will vary mainly as a function of cycle steam flow. To further complicate matters, the cycle steam temperature at the HP turbine exhaust will also vary with cycle steam flow. In the above referenced MSR controller, one mode of operation attempts to linearly increase the LP turbine steam inlet temperature by ramping the generated reference temperature set point at 100° F./hour There is provided no closed-loop control of LP turbine steam inlet temperature during the temperature ramp process. As a result, the variations in the upstream turbine process temperatures and pressures may cause undesirable temperature changes in the LP turbine. It is apparent then to improve the protection of the LP turbine elements against possible thermal stresses and distortion due to excessive temperature changes, an MSR control based on measured LP turbine inlet steam temperature is needed. It is another object of the invention to provide a closed-loop control function of the LP turbine steam inlet temperature across the turbine load spectrum. It is further apparent that LP turbine inlet steam temperature may not always provide enough information concerning LP turbine stationary and rotating blade metal temperatures considering the variation in the upstream turbine process parameters. Therefore, it is a further object of the invention to provide control functions based also on LP metal temperatures to improve the protection of the LP turbine elements.

In order to improve availability figures by reducing the downtime of nuclear turbines, the LP turbine steam inlet is provided at the sides of the LP turbine and below the horizontal joint to allow access to any of the LP turbine elements without prior disassembling of the conventional crossover piping and interceptor valves and without disturbing any other element. Side steam inlets also reduce erection time by permitting installation of crossover piping while rotors are being aligned. To reduce the amount of crossunder and crossover piping and simplify the piping arrangements to conform with the side entry LP turbines, two MSR's are provided and positioned on each side of the LP turbines. Each MSR conducts steam flow from one HP exhaust line through its heating chambers to one side of one or more LP turbines. Inlet steam to the LP turbines is not mixed prior to entering the LP turbine admission arc, thereby permitting a possible temperature differential across the admission arc. This temperature differential causes uneven thermal expansion in stationary and rotating LP turbine elements. Should these conditions become excessive and remain uncontrolled, it is possible for deleterious effects to result therefrom. Therefore, it is another object of this invention to provide an MSR controller to control the temperature differential across the LP admission arc within the operational limitations of the LP turbines.

SUMMARY OF THE INVENTION

The invention provides closed-loop control of a moisture separator reheater (MSR) heat transfer operation of cycle steam within a nuclear steam turbine power plant as a function of measured low pressure turbine temperatures. Measured parameters such as LP turbine inlet steam temperature, inlet metal temperature and exhaust metal temperature are utilized as feedback signals to effect control of LP turbine conditions within predetermined design limitations. The effects of excessive temperature changes in the LP turbine resulting in possible thermal stresses and distortion of parts therein brought about, for example, by variations in upstream turbine process temperatures and pressures are overcome. Furthermore, the control of the MSR heat transfer operation is performed autonomously in accordance with a predetermined set of LP turbine operational limitations thereby removing the control decision making responsibilities from the power plant operator or central computer.

Additionally, the present invention provides the means to control a plurality of reheating sections as part of a dual MSR heat transfer system functionally interfacing with one or more LP turbine sections within a nuclear power plant wherein each LP turbine section has split entry steam inlets. In this configuration, cycle steam exhausted from a high pressure turbine is conducted through one MSR to one steam inlet of one or more LP turbine sections and another MSR to the other steam inlet of the one or more LP turbine sections. More specifically, the control of the heat transfer operation is coordinated in each of the two MSR's to maintain the temperature difference across the steam admission arc of selected LP turbine sections within a specified design limit.

BRIEF DESCRIPTION OF THE DRAWINGS

FIG. 2 is a circuit diagram of a thermocouple amplifier suitable for use in the present invention;

FIG. 3 is a circuit diagram of a thermocouple junction temperature compensation system for use by the thermocouple amplifiers in FIG. 2;

FIG. 4 is a circuit diagram suitable for monitoring a load signal for use in one embodiment of the present invention;

FIG. 5 is a schematic diagram of relay logic which provides the sequential control for use in one embodiment of the present invention;

DESCRIPTION OF THE PREFERRED EMBODIMENT

Figure 1:
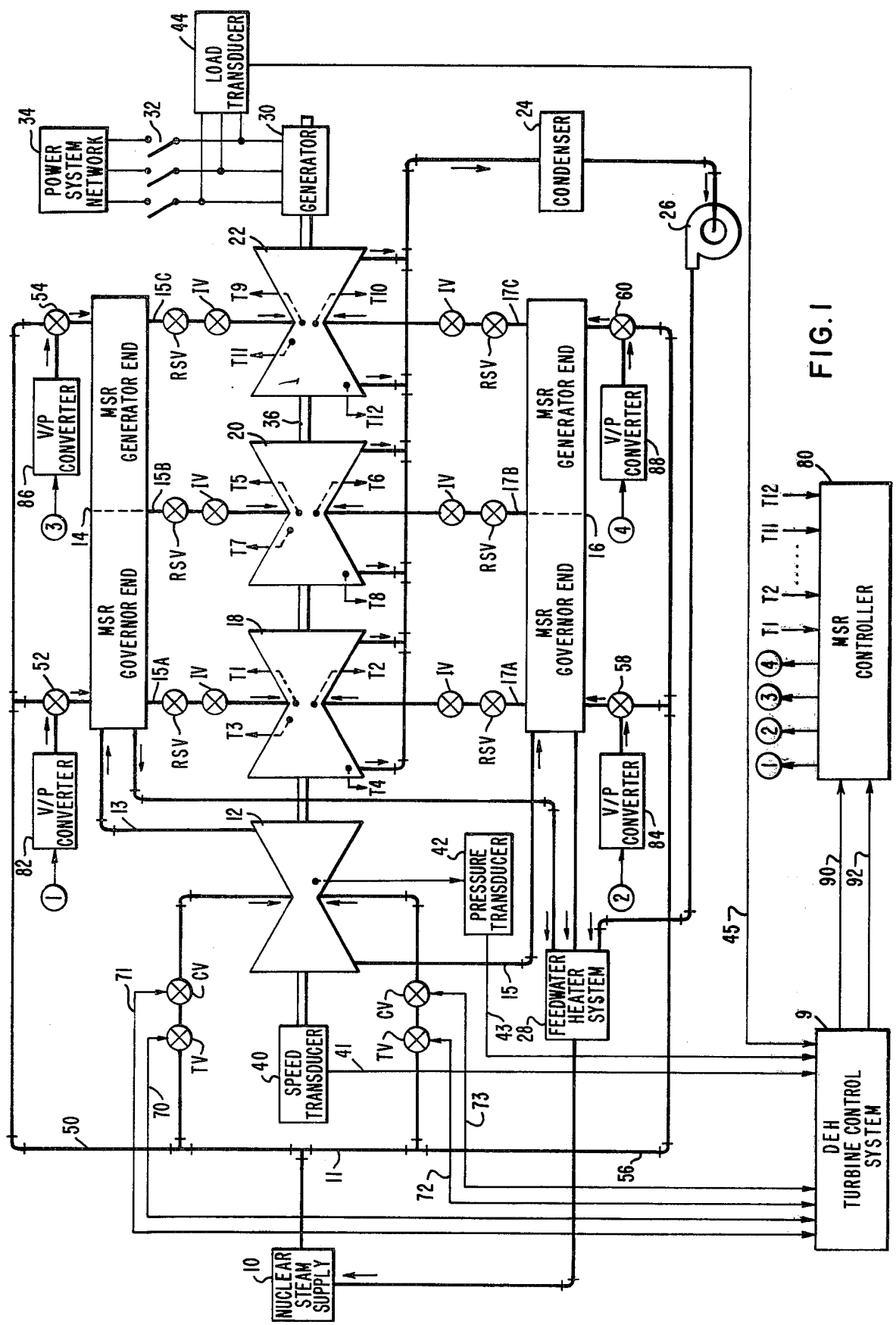
FIG. 1 is a schematic block diagram of a nuclear power plant embodying the present invention.

Referring to FIG. 1, a nuclear steam supply source 10 similar in function to a pressurized water reactor (PWR) or a boiling water reactor (BWR) generates steam in either a secondary cycle or a primary cycle, respectively. The cycle steam is supplied to a main steam header (MSH) 11 and from there, distributed to a double flow high pressure turbine 12 through sets of throttle valves (TV) and control valve (CV) which govern the steam flow thereto. Exhaust cycle steam from the HP turbine 12 is provided to two moisture separator reheaters (MSR's) 14 and 16 through crossunder piping arrangements 13 and 15, respectively. Each MSR 14 and 16 removes the moisture content and reheats the cycle steam as it flows therethrough. From the MSR's, cycle steam is transported to a plurality of low pressure (LP) turbines 18, 20 and 22. Cycle steam from MSR 14 is conducted through crossover piping arrangements 15A, 15B and 15C to one steam side inlet located below the horizontal joint of the LP turbines 18, 20, and 22, respectively. Cycle steam from MSR 16 is conducted through crossover piping arrangements 17A, 17B and 17C to the other steam side inlet also located below the horizontal joint of the LP turbines 18, 20 and 22, respectively. A set of reheat stop valves (RSV) and interceptor valves (IV) are used to govern steam flow through each crossover piping arrangement. The condenser system 14 accepts all LP turbine exhausted steam. Feedwater from the condenser 24 is pumped through the feedwater heater system 28 back to the nuclear steam supply system 10 by the feedwater pump 26 thus completing the cycle.

As the steam passes through the turbine sections 12, 18, 20 and 22, energy is transmitted from the steam to the turbine blading to exert a net torque on a turbine shaft 36 which is attached to and drives an alternating current generator 30. The generator 30 supplies electrical power to a power system network 34 upon closure of main breakers (BR) 32. The speed and load as generated by the turbine may be controlled by a digital electrohydraulic (DEH) turbine control system 9. Turbine speed is monitored by a speed transducer 40 and a speed signal is supplied to the DEH 9 over line 41. The first stage HP turbine pressure is measured by a pressure transducer 42 and a signal representative of the pressure is supplied to the DEH 9 over line 43. This pressure signal is proportional to turbine cycle steam flow and is used at times by the DEH 9 for closed-loop steam flow control. Another signal used for closed-loop control thereby is an electrical load signal as generated by a megawatt transducer 44 and supplied thereto over signal line 45. The throttle valves (TV) and control valves (CV) are positioned using set point position controllers within the DEH 9 over control lines 70, 71, 72 and 73 to control cycle steam input in accordance with the aforementioned measured turbine and generator parameters. The DEH turbine control system 9 as previously mentioned may be similar to that disclosed in U.S. Pat. No. 3,934,128, titled "System And Method For Operating A Steam Turbine With Improved Organization Of Logic And Other Functions In A Sampled Data Control" by Robert Uram, issued Jan. 20, 1976, which is incorporated by reference herein for a more detailed understanding thereof.

Steam temperatures in the flow of steam entering one side of LP turbines 18, 20 and 22 are monitored with apparatus similar to J-type thermocouples and designated in FIG. 1 as T1, T5 and T9, respectively. Steam temperatures in the flow of steam entering the other side of LP turbines 18, 20 and 22 are monitored with apparatus similar to J-type thermocouples and designated in FIG. 1 as T2, T6 and T10, respectively. A first row stationary blading metal temperature of LP turbines 18, 20 and 22 are monitored with apparatus similar to J-type thermocouples and designated in FIG. 1 as T3, T7, and T11, respectively. A last row of stationary blading metal temperatures of LP turbines 18, 20 and 22 are monitored with apparatus similar to J-type thermocouples and designated in FIG. 1 as T4, T8 and T12, respectively. An MSR controller 80 is provided to control the heat transfer process of the MSR's 14 and 16 in accordance with a function of a preferred selection of said LP turbine temperatures, T1 through T12. Heating steam is provided to MSR 14 from MSH 11 through steam line 50 and flow control valves 52 and 54 and to MSR 16 from MSH 11 through steam line 56 and flow control valves 58 and 60. The MSR's 14 and 16 are sectioned into two heating sections — governor end and generator end wherein is contained heating tube bundles through which heating steam is passed. Control valves 52 and 58 govern heating steam flow through the tube bundles of the governor end section and control valves 54 and 60 govern flow through the tube bundles of the generator end section of MSR's 14 and 16, respectively. The valves 52, 54, 58 and 60 are conventional pneumatically operated valves and may be approximately eight inches in diameter. Each valve 52, 54, 58 and 60 is controlled using conventional voltage-to-pressure (V/P) converters 82, 86, 84 and 88 over signal lines 1, 3, 2 and 4, respectively, by the MSR controller 80. Additionally, signals representative of generated turbine load and status of the main breakers (BR) 32 are supplied to the MSR controller 80 from the DEH 9 over signal lines 90 and 92, respectively.

Each thermocouple signal, T1 through T12 is signal conditioned and amplified within the MSR controller 80 using a conventional differential type amplifier 94 as shown in FIG. 2. An operational amplifier IC1 is arranged in a conventional differential amplifier configuration with resistors R1 through R6 and potentiometer P1. The thermocouple signal is attached differentially to the inputs to the amplifier at resistors R3 and R4. The values of R3 and R4 may be 10K ohms, for example. Resistor R5 which may be of the value 2M ohms, provides one leg of the differential configuration referenced to ground and T6 of the value 1.7M ohms plus P1 of the value of 0 to 500K ohms provide in series combination the feedback or other leg of the differential amplifier configuration. The potentiometer P1 is adjusted to balance the resistance in the two legs to eliminate voltage offsets due to common mode voltages and other sources. The capacitors C1 and C2 of the value 0.22μF. are selectively matched to provide input filtering of electrical noise. A common problem in interfacing thermocouple wire to copper is the development of an unwanted voltage potential at the connection, known more commonly as the cold junction potential, due primarily to the bimetallic thermionic properties of the materials. The undesirable cold junction voltage varies as a function of its ambient temperature in the same manner as the thermocouple measurement signal thereby making it nearly impossible to distinguish therefrom. However, another signal having the same voltage-to-temperature characteristics as the cold junction located in the same ambient temperature may be subtracted from the thermocouple plus cold junction potential to yield only the desired thermocouple temperature signal. Such a compensation signal may be produced by a compensation circuit as shown in FIG. 3 described in more detail hereinafter; and is provided to each thermocouple (T/C) amplifier type 94 in this particular embodiment for the purposes of subtracting from the input signal the unwanted cold junction potential. The cold junction compensation signal is connected in parallel to each T/C amplifier similarly through resistors R1 and R2 as shown in FIG. 2. All resistors used in this T/C amplifier circuit may be of an accuracy of 0.01% and a temperature coefficient of approximately 3 ppm/° C., for example. The closed loop gain of this particular T/C amplifier is approximately 200 which is suitable for purposes of this embodiment.

FIG. 3 presents an embodiment of a cold junction compensation signal generation circuit contained in the MSR controller 80. An integrated circuit temperature transducer IC2 which may be of the type manufactured by National Semiconductor Model No. LX5600A for example is connected to the dual operational amplifiers IC3 and IC4 in a differential amplifier configuration. A current as determined by the series resistor arrangement R7, R8, P2 and R10 and positive voltage supply potential, V+ is supplied to IC2 at pin C and is returned to ground reference at pin D. A voltage is established at commonly connected pins A and B of IC2 which is a function of the ambient temperature. Pins A and B of IC2 are connected to the non-inverting (+) input of IC4. The wiper arm of potentiometer P1 is connected to the non-inverting input (+) of IC3 and is adjusted to equal the voltage of the input, pins A and B, of IC2 at a predetermined temperature to establish a zero potential between the outputs of IC3 and IC4. A zero potential temperature of 32° F. may be chosen for this embodiment. Suitable resistor values for R7, R8, P2 and R10 such as 8.2K ohms, 560K ohms, 100K ohms and 360K ohms, respectively, may be chosen for this embodiment. The resistor configuration consisting of R11, R12 and R13 wherein the junction of R11 and R12 is fed back to the inverting input (−) of IC3 and likewise, the junction of R12 and R13 is fed back to the inverting input (−) of IC4 establishes the close-loop differential amplifier gain in accordance with the basic formula $$\left(\frac{R11 + R12 + R13}{R12}\right).$$

Suitable resistor values of R11, R12 and R13 such as 4K ohms, 100K ohms and 4K ohms, respectively may be chosen for the purposes of this embodiment thereby providing a closed-loop gain of 1.08. The differential signal produced by the described embodiment will characterize the bimetallic thermionic potentials developed at the cold junctions and may be supplied to the input T/C amplifier as described in the typical embodiment of FIG. 2.

Referring to FIG. 4, representative load signal 90 supplied to the MSR controller 80 from the DEH 9 is inputted to a comparator circuit 96 within the MSR controller 80. The load signal 90 is coupled to the non-inverting input (+) of an operational amplifier IC5 through a resistor R20. A predetermined comparison voltage potential is established at the junction of the resistor divider network R21 and R22 using voltage supply, Vs+. The junction of R21 and R22 is connected to an inverting input (−) of IC5. The output of IC5 as governed by the potentials at its (+) and (−) inputs provides current through resistor R23 to the base of transistor, T1, to switch T1 "on" and "off" in a conventional manner. At times when T1 is switched "on", current is supplied through relay RY1 and T1 to ground reference from a voltage supply, Vs+, thereby energizing RY1. Likewise, when T1 is switched "off", current is no longer supplied to RY1 thereby deenergizing RY1.

Diode D1 is provided across RY1 to suppress large voltage spikes which would tend to develop across RY1 as a result of the instantaneous current switching by T1. The predetermined comparison voltage selected for this embodiment and suitable for use in the invention is 35% of the rated representative load signal. At times when the load signal increases beyond 35% of rated, IC5 will saturate to a positive voltage generating sufficient current through R23 to switch T1 "on". Current is conducted though RY1 for supply Vs+, thus energizing RY1. In a similar manner, when the load signal falls below 35% rated, the relay RY1 will be deenergized. A normally open contact RC1, shown in FIG. 5, will close and open corresponding to the energization and deenergization of relay RY1.

A relay logic schematic for control of the sequential operation of the MSR controller 80 is shown in FIG. 5. More specifically, a normally closed contact closure CC1 is supplied to the MSR controller 80 from the DEH 9 over signal line 92 as shown in FIG. 1. With the main breakers 32 open, CC1 is closed thereby providing current from supply Vs+ to energize relay RX and when the turbine is synchronized to the frequency of the power system network 34 and the main breakers 32 are closed, CC1 will open thereby deenergizing RX. To energize relay TX, the turbine load must be increased to 35% rated at which time RC1 is closed. With relay TX energized and relay RX deenergized, relay contacts RX and TX will both be closed, thereby "sealing in" relay TX. Should the load drop below 35% of rated, relay TX will remain energized. Only if the turbine should "TRIP" and the main breakers 32 be driven open will the relay RX be again energized and normally closed relay contact RX be opened to break the current flow to deenergize relay TX.

Figure 6:
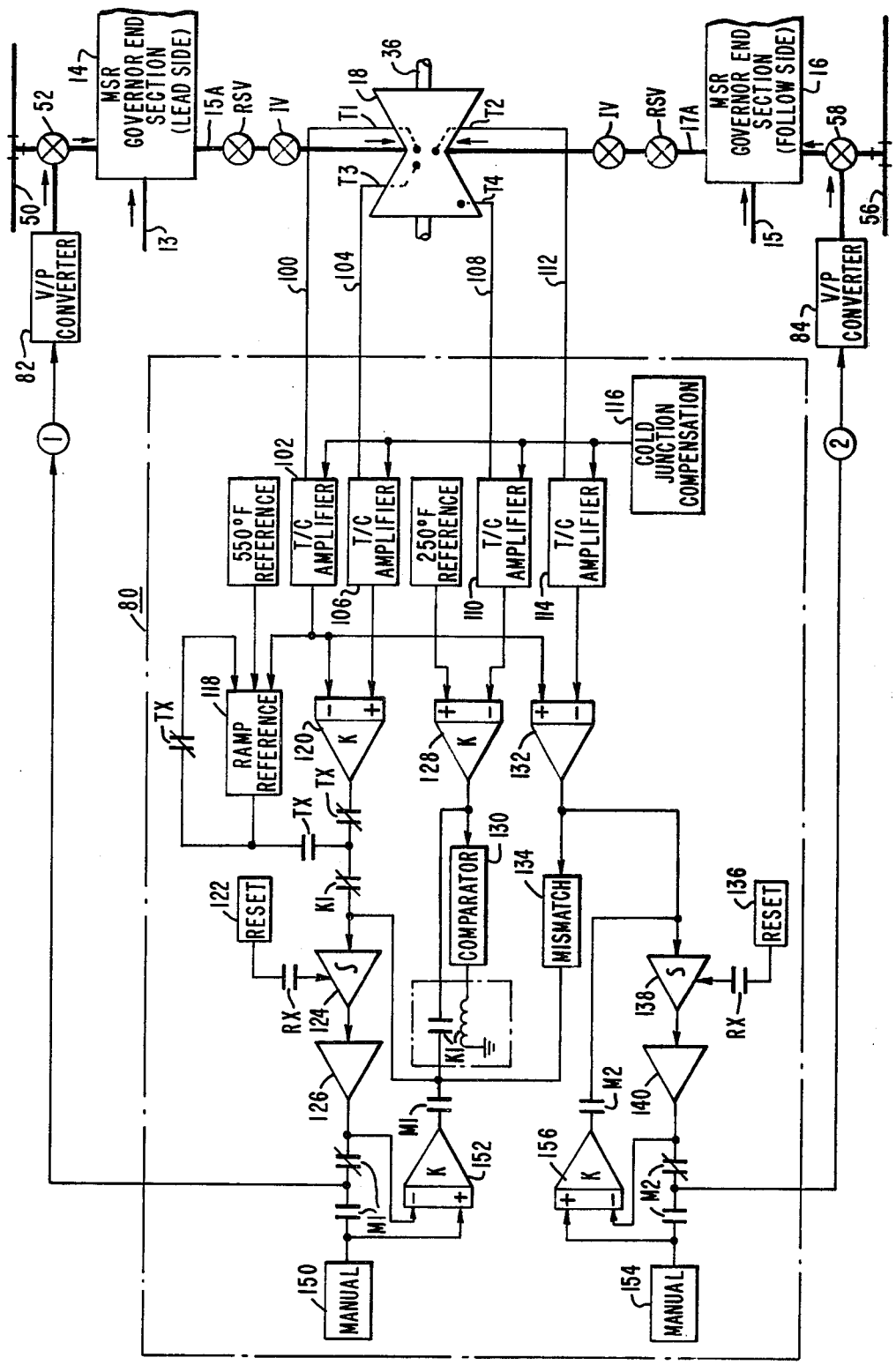
FIG. 6 is a functional block diagram of a portion of the moisture separator reheater controller in accordance with one embodiment of the present invention.

A functional schematic illustrating the operation of the preferred embodiment of an MSR controller is shown in FIG. 6. As was described in the embodiment of FIG. 1, the HP turbine exhaust cycle steam is passed through the MSR 14 and crossover piping 15A to one side of LP turbine 18. Also, the HP exhaust cycle steam is passed through MSR 16 and crossover piping 17A to the other side inlet of LP turbine 18. Heating steam flow into the tube bundles of the governor end section of MSR 14 is controlled by valve 52 and similarly, heating steam flow into the tube bundles of the governor end section of MSR 16 is controlled by valve 58.

The temperature of the steam entering one side of LP turbine 18 via crossover piping 15A, is monitored by thermocouple T1. The thermocouple (T/C) signal T1 is coupled to T/C amplifier 102 over signal line 100. The temperature of steam entering the other side of LP turbine 18 via crossover piping 17A is monitored by T/C T2 which is coupled to T/C amplifier 114 over signal line 112. The first row stationary blade metal temperature of LP turbine 18 which provides an indication of inlet metal temperature is monitored by T/C T3 which is coupled to T/C amplifier 106 over signal line 104. The temperature of the last row stationary metal temperature which provides an indication of exhaust metal temperature is monitored by T/C T4 which is coupled to T/C amplifier 110 over signal line 108. All T/C amplifiers are of the type described in FIG. 2. Corrections are made for the T/C connections in each T/C amplifier by the cold junction compensation circuit 116 which is of the type described in FIG. 3. All of the other functional blocks will be described in greater detail hereinbelow.

A ramp reference functional block 118 has an input signal representative of steam temperature T1 (input of T/C amplifier 102), a signal representative of 550° F. reference and the output of block 118 conducted through a normally closed (NC) contact TX. The differential amplifier 120 has an input signal representative of steam temperature T1 (inverting input) and a signal representative of metal temperature T3 which is the output of T/C amplifier 106 (non-inverting input). The outputs of 118 and 120 are each connected to a normally open (NO) and (NC) contact TX which form a single pole double throw (SPDT) contact arrangement. The junction of the NC and NO TX contacts is coupled to an integrator function 124 through NC contact K1. The integrator incorporates a reset function 122 using NO contact RX. Output of integrator 124 is buffered by amplifier 126 and outputted from the MSR controller 80 through NC contact M1 over signal line 1 to drive the voltage-to-pressure (V/P) converter 82. In response to its input signal 1, V/P converter 82 drives the position of control valve 52 which governs the heating steam flow from the MSH 11 via line 50 to the MSR 14.

A differential amplifier 132 has an input signal representative of T1 (non-inverting input) and a signal representative of steam temperature T2 which is the output of T/C amplifier 114 (inverting input). The output of 132 is coupled to an integrating function 138 which also incorporates a reset function 136 using NO contact RX. The output of integrator 138 is buffered by amplifier 140 and outputted from the MSR controller 80 through NC contact M1 over signal line 2 to drive the voltage-to-pressure (V/P) converter 84. The V/P converter 84 controls heating flow into MSR 16 by positioning valve 58 in the same manner as previously described for valve 52.

A differential amplifier 128 has an input signal representative of the metal temperature T4 which is the output of T/C amplifier 110 (inverting input) and a signal representative of 250° F. reference (non-inverting input). The output of 128 is coupled to comparator 130 which drives relay K1. Also, the output of 128 is coupled to integrator funtion 124 through a NO contact K1. The output of amplifier 132 is coupled to a mismatch control function 134 and the output of 134 is coupled to the input of integrator 124.

Manual functions 150 and 154 are coupled to V/P converters 82 and 84 through NO contacts M1 and M2 and differential amplifiers 152 and 156 (non-inverting input), respectively. Also, the outputs of buffer amplifiers 126 and 140 are coupled to differential amplifiers 152 and 156 (inverting inputs), respectively. All of the functional blocks referenced to above will be described in greater detail hereinbelow.

A typical functional operation of the embodiment of FIG. 6 is as follows. Prior to synchronization, (main breaker 32 open) the reset relay RX (see FIG. 5) is energized. Reset functions 122 and 136 inhibit the operation of the integrators 124 and 136, respectively, and fix the outputs thereof to keep the heating system flow control valves 52 and 58 closed. Upon synchronization (main breakers 32 closed), the relay RX is deenergized thereby disabling the effect of the reset functions 122 and 136. Below a predetermined load measurement typically 35% rated load, the integrator 124 operates to govern the heating steam flow through the governor of MSR 14 via control valve 52 and V/P converter 82 to converge the one side steam inlet temperature T1 to the inlet metal temperature T3 utilizing the error produced by differential amplifier 120. If the LP turbine exhaust metal temperature T4 should exceed a reference limit wherein 250° F. was considered suitable for this embodiment and typical of an LP turbine operational limitation, the comparator 130 will energize relay K1 thereby closing NO contact K1 and opening NC contact K1. In this state, integrator 124 is responsive to the error generated by amplifier 128 and operative to decrease the metal temperature T4 below the reference temperature by governing the heating system flow to MSR 14 in the manner previously described. When the temperature T4 drops below the reference limit, comparator 130 deenergizes K1 and the integrating 124 is again responsive to amplifier 120 whereby functioning to equalize one side steam inlet temperature T1 to the inlet metal temperature T2. The control of metal temperature T4 is performed intermittently as the need arises independent of the load measurement. While below 35% rated load, the ramp reference 118 keeps its output at zero potential by tracking a ramp control signal produced therein to the signal representative of T1.

At a predetermined load measurement typically 35% rated load, the relay TX is energized (see FIGS. 4 and 5) and NO contacts TX close and NC contacts TX open. Concurrently, the ramp reference 118 initiates therein a temperature reference ramp wherein a ramp rate of 100° F./hour was considered suitable for this embodiment and typical of the operational limitations of an LP turbine. Since the ramp control signal generated within the ramp reference is continuously tracked to the signal representative of T1 prior to energizing relay TX, the error between the two signals will be zero at ramp initialization (TX energized). The output of the ramp reference 118 is produced by the amplified error between said ramp and T1 signals therein and is used to govern the integrator 124. The integrator 124, in turn controls the heating steam input to the MSR 14 as previously described whereby the LP turbine one side steam inlet temperature T1 is ramped in time under closed-loop control conditions. The temperature reference signal is terminated at a signal representative of 550° F. whereupon the LP turbine steam temperature T1 is controlled thereto under similar closed-loop control conditions. Once the relay TX has been energized (see FIG. 5), it becomes "sealed in". Therefore, once the temperature reference signal generated within the ramp reference 118 has terminated at a signal representative of 550° F., the integrator function 124 will respond to control the LP turbine steam temperature T1 at 550° F. and to control the LP exhaust metal temperature T4 below 250° F. even at load measurements below 35% of rated load. Only in the event of a turbine "trip" in which case the main breakers 32 are opened will the relay TX be deenergized and the relay RX energized, at which time all heating steam to the MSR's 14 and 16 is closed off by the reset functions 122 and 136. Upon reclosure of breakers 32, heating steam is again controlled as a function of temperatures T1 and T3 as previously described hereinabove.

Further, integrator 138 responds to the amplified error signal between the signals representative of the LP turbine steam inlet temperatures T1 and T2 as affected by amplifier 132 to govern the position of control valve 58 which in turn controls the heating steam flow into the MSR 16 whereby the LP turbine other side steam inlet temperature T2 is controlled equal to the one side steam inlet temperature T1. As the one side steam temperature T1, referred to hereafter as the lead side temperature, is controlled by the previously described control apparatus, the other side steam temperature T2, referred to hereafter as the follow side temperature, is forced to follow temperature T1 by the apparatus comprising amplifier 132, integrator 138 and amplifier 140 which will be described in greater detail hereinbelow.

At times when the control of the follow side temperature T2 is lost, for example: when a malfunction occurs in the follow side MSR 16, or when the RSV and IV of crossover piping 17A are being tested, the remaining functional control side must respond to maintain the temperatures T1 and T2 within a predetermined temperature differential wherein ±50° F. was selected for the purposes of this invention and considered typical of LP turbine inlet operational limitations. The mismatch control function 134 is incorporated within the MSR controller 80 for such purpose and is described in more detail in connection with the description of FIG. 7. As an example of mismatch control operation, assume that the follow side MSR 16 has malfunctioned and the follow side temperature T2 is decreasing. The mismatch control function 134 detects a temperature differential greater than 50° F. At which time, function 134 conducts the temperature error signal output of amplifier 132 to the input of integrator 124 with the correct amplification and polarity such as to affect control of lead side temperature T1 to the follow side temperature T2 within 50° F. as it decreases.

Manual functions 150 and 154 are also provided within MSR controller 80 for manually positioning the control valves 52 and 58, respectively. At times when manual is selected N0 contacts M1 and M2 are closed and NC contacts M1 and M2 are opened. The position signal to V/P converter 82 is derived in manual controller 150 and the position signal to V/P converter 84 is derived in manual controller 154. When in manual, all coordinated closed-loop temperature control is lost. Generally, this mode is provided for purposes of an orderly "shutdown" in cases of a severe malfunction. While in manual, the automatic system, if capable, tracks the manually varying valve position signals 1 and 2. More specifically, the differential amplifiers 152 and 156 provide a signal to their respective integrators 124 and 138 through N0 contacts M1 and M2 to equalize the outputs of buffer amplifiers 126 and 140 to their respective manual output signals 150 and 154 thereby automatically tracking the manual position signals.

An identical system as that described in connection with FIG. 6 is provided for control of the temperatures T9, T10, T11 and T12 of LP turbine 22. Heating steam flow is controlled by valves 54 and 60 into the tube bundles of the generator end heating sections of MSR's 14 and 16, respectively thereby. The temperatures T5, T6, T7, and T8 of the middle LP turbine 20 are monitored and displayed to the operator and are not used for control purposes.

Figure 7:
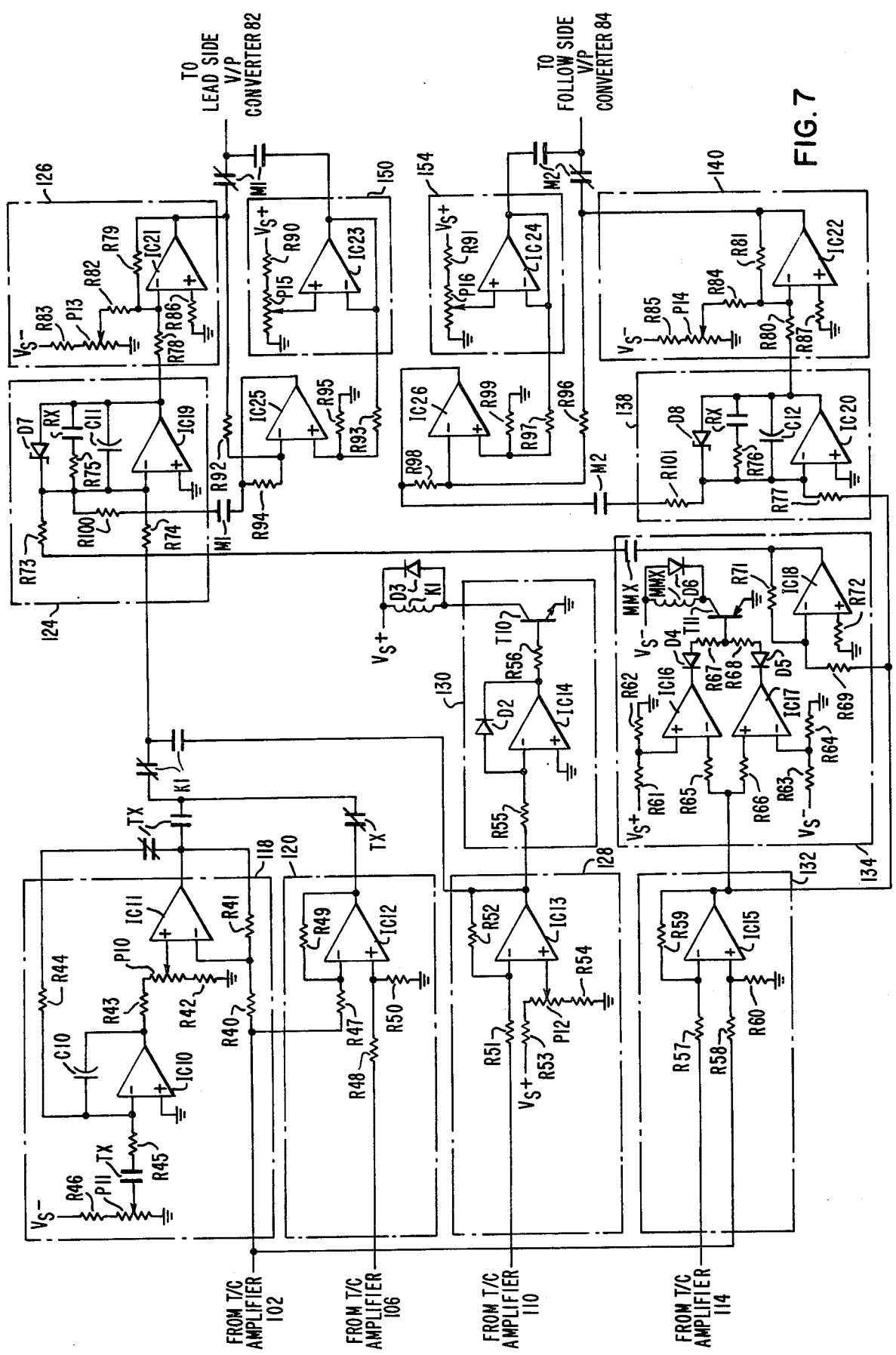
FIG. 7 is a circuit schematic illustrating an implementation of the functional block diagram of FIG. 6 in accordance with one embodiment of present invention.

Referring to FIG. 7, the ramp reference function 118 has an input signal representative of lead inlet temperature T1 (output of T/C amplifier 102) which is coupled to the inverting input (−) of an operational amplifier IC11 through a resistor R40. A feedback resistor R41 is connected between the output of IC11 and its (−) input. The output of IC11 is coupled to the (−) input of an operational amplifier IC10 through NC contact TX and resistor R44. Resistors R46 and P11 are connected in series between the negative supply voltage and ground. The wiper of the potentiometer P11 is coupled to the (−) input of IC10 through NO contact TX and resistor R45. Connected across IC10 is capacitor C10 to form a conventional integrator configuration. The output of IC10 is coupled through resistors R43, P10 and R42 in series to ground. The wiper of potentiometer P10 is connected to the (+) input of IC11. The non-inverting (+) input of IC10 is referenced to ground.

At times when relay TX is not energized, the output of IC11 generates current through R44 which is integrated by capacitor C10 to affect a voltage at the wiper of P10 equal to the output of T/C amplifier 102. In such a manner, the voltage at the P10 wiper is kept equal to the signal representative of the temperature T1 and the output of IC11 (also the output of ramp reference function) is kept as close to zero potential as possible. At times when relay TX is energized, current is supplied to IC10 through R45 from the voltage potential set at the wiper of P11 wherein said current is integrated by the integrator configuration of IC10 and C10 to produce a voltage ramp at the wiper of P10 (+ input of IC11) representative of the temperature ramp reference. The voltage potential as adjusted at the wiper of P11 establishes the rate (typically 100° F./hour) of the temperature reference ramp and the voltage potential as adjusted at the wiper of P10 when IC10 is saturated is representative of the limiting steam temperature reference setting (typically 550° F.). The error between the reference and measured temperatures as established at IC11 is used to drive integrator 124 such to affect closed-loop control of temperature T1 at times when relay TX is energized.

The amplifier circuit 120 is a conventional differential amplifier configuration comprising operational amplifier IC12 and resistors R47, R48, R49 and R50. The signal representative of steam temperature T1 is inputted through R47 and a signal representative of metal temperature T3 (output of 106) is inputted through R48. The error between said signals is amplified by the closed-loop gain of 120 which was chosen to be 0.1 for the purposes of this embodiment and is used to drive integrator 128. In this manner, the steam temperature T1 is matched to the metal temperature P3 using closed-loop control techniques at times when relay TX is not energized.

In the amplifier 128, a reference voltage representative of the temperature limit of T4 is established at the wiper of potentiometer P12 within the combination of series resistors R53, P12 and R54 connected between a positive supply voltage Vs+ and ground. The reference voltage (wiper of P12) is connected to operational amplifier IC13 at the (+) input. A signal representative of the metal temperature T4 (output of T/C amplifier 110) is supplied to resistor R51 which is connected to the (−) input of IC13. A feedback resistor R52 is connected across IC13 to establish the closed-loop gain of 128. The output of IC13 is input to comparator 130 at resistor R55 which is connected to a (−) input of an operational amplifier IC14. The (+) input of IC14 is referenced to zero potential. Diode D2 is connected across IC14 such as to clamp the output of IC14 to drive no lower than one diode drop below zero potential. When the T4 metal temperature signal becomes greater than the temperature limit signal (wiper of P12) which for the purposes of this embodiment was chosen to be 250° F., the output of IC13 will respond with a negative signal. Once the output of IC13 goes negative, the output of IC14 switches to positive saturation thereby turning on transistor T10 with a supply of current through resistor R6 connected between the output of IC14 and the base of T10. As current flows through T10, relay K1 connected to the collector thereof, becomes energized and NO contact K1 closes and NC contact K1 opens. In this state, the signals from either IC12 or IC11 as the case may be, are disconnected from the integrator 124 and the output of IC13 is connected thereto whereby the error between the reference and measured temperatures of amplifier 128 drives the integrator 124 such to affect closed-loop control of the metal temperature T4 above 250° F. Accordingly, as the temperature T4 drops below 250° F., the output of IC13 becomes positive thereby switching the output of IC14 into negative saturation clamped by diode D2. Transistor T10 is turned off by the elimination of current to the base thereof thus affecting the deenergization of relay K1. Diode D3 is connected across relay K1 to eliminate voltage spiking in a conventional manner. When K1 is deenergized, the drive of integrator 124 will be returned to either device 118 or 120 as the case may be.

The amplifier circuit 132 is a conventional differential amplifier circuit comprising an operational amplifier IC15 and resistors R57, R58, R59 and R60. The signal representative of steam temperature T1 (output of 182) is supplied to R58 which is connected to the (+) input of IC15 and a signal representative of the steam temperature T2 (output of T/C amplifier 114) is supplied to R57 which is connected to the (−) input of IC15. The output of IC15 is a signal representative of the error between temperatures T1 and T2 which is used to drive integrator 138 such to effect closed-loop control in matching temperature T2 to temperature T1. The output of IC15 is also supplied to a mismatch control circuit 134 wherein a window comparator circuit monitors the temperature differential signal (output of IC15) for out-of-limit conditions. Such signal is supplied to resistors R65 and R66 which are connected to the (−) and (+) inputs of operational amplifiers IC16 and IC17, respectively. A voltage signal representative of the high temperature differential limit (typically +50° F.) produced by the voltage divider network consisting of resistors R61 and R62 is supplied to the (+) input of IC16. Likewise a signal representative of the low temperature differential limit (typically −50° F.) produced by the voltage divider network consisting of resistors R63 and R64 is supplied to the (−) input of IC17. The outputs of IC16 and IC17 are connected in a diode "or"ing configuration consisting of diodes D4 and D5, resistors R67 and R68 and transistor T11 such that when either IC16 or IC17 is switched into negative saturation transistor T11 is turned on permitting current to energize relay MMX connected to the collector thereof.

Assuming the temperature differential signal (output of IC15) exceeds its high reference limit which is an indication that temperature T2 is not following T1 within 50° F., the IC16 responds by switching its output into negative saturation thereby permitting current to flow through the emitter-base junction of T11, R67 and diode D4 which turns on T11 and energizes relay MMX. The NO contact MMX closes conducting current from an inverted polarity temperature differential signal as produced by a conventional inverter amplifier circuit, comprising operational amplifier IC18 and resistors R69, R71 and R72, through resistor R73 to the integrator 124. Consequently, temperature T1 is closed-loop controlled to follow temperature T2. Signal scaling is established utilizing resistors R73 and R74 such to permit the mismatch control circuit 134 to override the other signals driving integrator 124 making the mismatch signal (output of IC18) the dominant one. Typical values of R73 and R74 chosen for this embodiment are 10K and 100K, respectively.

The integrator circuits 124 and 138 are of the conventional type wherein C11 and C12 are connected across operational amplifiers IC19 and IC20, respectively. Resistors R74 and R77 are used to scale the inputs of IC19 and IC20 and Zener diodes D7 and D8 are used to clamp the output voltages thereof. The resistors R75 and R76 are provided to keep capacitors C11 and C12 discharged and unresponsive to input signals during such times when the relay RX is energized. Buffering the output signals of integrators 124 and 138 are conventional inverting amplifier circuits 126 and 140, respectively. In buffer 126, resistors R78 and R79 establish the closed-loop gain of operational amplifier IC21 and the (+) input thereof is referenced to ground through resistor R86. An offset voltage is provided by resistor network connected between the negative supply Vs− and ground P13 wherein the wiper of P13 is coupled to the (−) input of IC21 through resistor R82. The output voltage of buffer 126 is used to position control valve 52 utilizing V/P converter 82 at times when not in manual. A typical voltage range of the output of 126 is 1 to 9 volts corresponding to positioning valve 52 from full closed to full open. Buffer 140 is implemented identical to buffer 126 comprising operational amplifier IC22, resistors R80, R81, R84, R85 and R87 and potentiometer P14 wherein R80 and R81 establish the closed-loop gain of IC22, the combination R85, P14 and R84 establishes the offset voltage (typically 1V) and R87 references the (+) input of IC22 to ground. The output of buffer 140 is used to position control valve 58 utilizing V/P converter 84 at times when not in manual. Likewise, the output voltage 140 is typically 1 to 9 volts.

Manual system 140 (154) as shown in FIG. 7 is implemented using an adjustable voltage divider network consisting of resistor R90 (R92) and potentiometer R15 (P16), connected in series from the positive voltage supply to ground wherein the wiper of P15 (P16) is buffered conventionally by a unity gain follower operational amplifier IC23 (IC24). The output of IC23 (IC24) varies typically 1 to 9V according to the adjustment of P15 (P16) and is used to control valve 52 (58) at times when a manual (i.e. NO contact M1 is closed and NC contact M1 is open).

Tracking circuits 152 and 156 are conventional differential amplifier circuits which function, at times when in manual, to drive their respective integrator circuits 124 and 138 such to equalize the outputs of buffer amplifiers 126 and 140 to their respective manual outputs of 150 and 154. Circuit 152 provides current which is proportional to the error between its input signals to the integrator 124 through NO contact M1 and resistor R100 (typically 10K) at times when in manual. Should the output of buffer 126 be less than the manual signal of 150, current will be supplied to 124 by 152 to cause the output of IC19 to increae negatively. This, in turn, affects a positive increase at the output of 126 thereby converging the output of 126 to the manual signal of 150. The differential amplifier circuit of 156 operates similarly employing the current path via NO contact M2 and resistor R101 (typically 10K) to the integrator 138 to converge the output of buffer 140 to the manual output of 154.

In summary, it is apparent from the foregoing description that the invention provides closed-loop control of the MSR heat transfer operation as a function of measured LP turbine temperatures. Operational limitations of the LP turbine are maintained in accordance with signals representative of actual LP turbine steam and metal temperatures such as the inlet steam temperatures, first row stationary blading metal temperature and the last row stationary blading metal temperature, thereby overcoming any effects resulting from variations in upstream turbine process temperatures and pressures, which are for example, undesirable excessive temperature changes causing possibly, at times, thermal stresses and distortion to LP turbine parts.

Further, the disadvantages of burdening the operator, at times, with the difficult decisions of sequencing the MSR controller between operational control modes based on his judgment of turbine conditions especially when the decisions there are most likely to occur concurrent with other equally necessary control decisions are overcome by the present invention. An autonomous control of MSR operation is provided in the present invention in accordance with a predetermined set of LP turbine operational limitations and selected measured parameters as described in the above specification.

Additionally, the present invention provides means to control dual MSR's functioning with one or more LP turbines in a cycle steam turbine within a nuclear power plant wherein each LP turbine has split side entry steam inlet ports. The lead and following control apparatus and temperture mismatch function as described in the above specification provide the additional needed protection of the LP turbines as required by their operational limitations.

Although the embodiment described herein utilizes analog electronic circuitry as shown in FIG. 7, for example, it is understood that the system of the invention may use a digital computer or microprocessor. It is further understood that the invention may also be practiced in an electric power plant with only one or two low pressure turbine sections and moisture separator reheaters. Accordingly, it is desired that the invention not be limited by the embodiment described but rather that it be accorded an interpretation consistent with its broad principles.

We claim:
1. An electric power plant comprising:
means for generating cycle steam;
a steam turbine, said turbine at least including a high pressure (HP) turbine section and a low pressure (LP) turbine section to conduct cycle steam therethrough;
cycle steam reheating means, said reheating means being coupled between said high pressure turbine and low pressure turbine sections to reheat said cycle steam exhausted from said high pressure turbine sections prior to entering said low pressure turbine section;
a heating steam source for providing heating steam to said reheating means to be utilized by said reheating means for reheating the cycle steam conducted between said high pressure turbine section exhaust and said low pressure turbine section input;
first means to generate a signal representative of the actual low pressure turbine section inlet steam temperature;

second means to generate a signal representative of the actual low pressure turbine section inlet metal temperature;

first control means governed by said signals generated by said first and second means to control the reheating of said cycle steam by said reheating means by regulating the amount of heating steam provided thereto;

third means to generate a signal representative of the actual low pressure turbine section exhaust metal temperature; and second control means governed by the signal generated by said third means to at times control the reheating of the cycle steam by said reheating means by regulating the amount of heating steam provided thereto.

2. An electric power plant comprising:

means for generating cycle steam;

a steam turbine, said turbine at least including a high pressure (HP) turbine section and a low pressure (LP) turbine section, said LP turbine section including at least two steam inlets;

a first heating means coupled between said HP turbine section and one of said steam inlets of said LP turbine section to heat cycle steam conducted therethrough;

a second heating means coupled between said HP turbine section and the other of said steam inlets of said LP turbine section to heat cycle steam conducted therethrough;

a first means to generate a signal representative of the actual steam temperature of one of said inlets of said LP turbine section;

a second means to generate a signal representative of actual steam temperature of the other of said inlets of said LP turbine section;

a first control means governed by said signal generated by said first means to control at times the heating of said cycle steam by said first heating means; and a second control means governed by said signals generated by said first and second means to control the heating of said cycle steam by said second heating means.

3. An electric power plant according to claim 2 further including:

third means to generate a signal representative of the actual LP turbine section inlet metal temperature; and third control means governed by the signals generated by said first and third means to at times control the heating of said cycle steam by said first heating means.

4. An electric power plant according to claim 3 and further including:

fourth means to generate a signal representative of the actual LP turbine section exhaust metal temperature; and fourth control means governed by the signal generated by said fourth means to control at times the heating of said cycle steam by said first heating means.

5. An electric power plant according to claim 4 wherein only one of the first, third and fourth control means controls the heating of the cycle steam by the first heating means at times when the power plant operation is above a first predetermined load level.

6. An electric power plant according to claim 5 wherein only the fourth control means of the first, third and fourth control means controls the heating of the cycle steam by the first heating means at times when the signal representing the actual low pressure turbine exhaust metal temperature is above a predetermined level.

7. An electric power plant according to claim 6 wherein only the first control means of the first and third control means controls the heating of the cycle steam by the first heating means at times when the power plant operation is above a second predetermined load level, said second predetermined load level being greater than the first predetermined load level.

8. An electric power plant according to claim 2 further including a fifth control means governed by the algebraic difference of the signals generated by the first and second means to control the heating of the cycle by the first heating means at times when the absolute value of said signal difference is beyond a predetermined value.

9. An electric power plant according to claim 2 further including an inhibiting means to inhibit control of the heating of cycle steam by the first and second heating means at times when the power plant is below a first predetermined load level; wherein said inhibiting means provides the first and second heating means with a signal below a zero control reference level at times when the power plant is below a first predetermined load level.

10. An electric power plant according to claim 3 wherein the third control means at times controls the heating of the cycle steam by the first heating means to effect convergence of the signal representative of the low pressure turbine section one side inlet steam temperature to the signal representative of the low pressure turbine section inlet metal temperature, whereby the third control means, the first heating means and low pressure turbine section inlet constitutes a closed-loop control system wherein the reference signal is said inlet metal temperature signal and the feedback signal is said one side inlet steam temperature.

11. An electric power plant according to claim 4 wherein the fourth control means at times controls the heating of the cycle steam by the first heating means to effect convergence of the signal representative of the low pressure turbine section exhaust metal temperature to a predetermined signal level, whereby the fourth control means, the first heating means and the low pressure turbine section inlet at times constitute a closed-loop control system wherein the reference signal is said predetermined level signal and the feedback signal is said exhaust metal temperature.

12. An electric power plant according to claim 2 wherein the first control means at times controls the heating of the cycle steam by the first heating means to effect convergence of the signal representative of the low pressure turbine section one side inlet stream temperature to a predetermined reference signal, said reference signal at times varying in accordance with a predefined time function, whereby the first control means, the first heating means and the low pressure turbine section inlet constitute a closed-loop control system wherein said one side inlet steam temperature signal is the feedback signal.

13. An electric power plant according to claim 2 wherein the second control means controls the heating of cycle steam by the second heating means to effect convergence of the signal representative of the low pressure turbine section other side inlet steam temperature to the signal representative of the low pressure turbine section one side inlet steam temperature, whereby the second control means, the second heating means and the low pressure turbine section inlet constitute a closed-loop control system wherein the reference signal is said one side inlet steam temperature and the feedback signal is said other side inlet steam temperature.

14. An electric power plant according to claim 8 wherein the fifth control means at times controls the heating of the cycle steam by the first heating means to effect convergence of the absolute difference of the signals representative of the low pressure turbine section one and other inlet steam temperatures to a predetermined value only when said absolute signal difference is beyond said predetermined value.

15. An electric power plant according to claim 4 including a heating steam source for providing heating steam to the first and second heating means which is utilized by the first and second heating means for heating the cycle steam conducted therethrough; wherein the first control means controls the heating of the cycle steam by the first heating means by regulating the amount of heating stream provided thereto; and wherein the second control means controls the heating of the cycle steam by the second heating means by regulating the amount of heating steam provided thereto.

16. An electric power plant according to claim 15 wherein the third control means controls the heating of cycle steam by the first heating means by regulating the amount of heating steam provided thereto.

17. An electric power plant according to claim 16 wherein the fourth control means controls the heating of cycle steam by the first heating means by regulating the amount of heating steam provided thereto.

18. An electric power plant according to claim 8 further including a heating steam source for providing heating steam to the first heating means which is utilized by the first heating means for heating the cycle steam conducted therethrough; and wherein the fifth control means controls the heating of the cycle steam by the first heating means by regulating the amount of heating steam provided thereto.

19. An electric power plant comprising:
an electric generator;
means for generating cycle steam;
a steam turbine, said turbine including a high pressure turbine section and a plurality of low pressure turbine sections for conducting cycle steam therethrough, said high pressure and low pressure turbine sections being mounted on a single shaft to drive said electric generator, said low pressure turbine section adjacent said electric generator being the generator end low pressure turbine section and said low pressure turbine section adjacent said high pressure turbine section being the governor end low pressure turbine section;
a cycle steam reheater unit coupled between said high pressure turbine section and each inlet of said plurality of low pressure turbine sections to reheat cycle steam conducted therethrough and manifoldly distribute said reheated steam to each inlet of said low pressure turbine sections, said reheater unit integrally including first and second reheating sections for distributively heating cycle steam conducted through said reheater unit;
means to generate signals representative of actual temperature conditions within said generator end and governor end low pressure turbine sections;
first control means governed by the signals representative of actual temperature conditions within the governor end low pressure turbine section to control the distributive heating of the cycle steam, conducted through said reheater unit, by the first reheating section; and
second control means governed by the signals representative of temperature conditions within the generator end low pressure turbine section to control the distributive heating of the cycle steam, conducted through said reheater unit, by the second reheating section.

20. An electric power plant according to claim 19 wherein the temperature signals generated are representative of the inlet steam, inlet metal and exhaust metal of the corresponding generator end and governor end low pressure turbine sections.

21. An electric power plant according to claim 20 wherein:
first reheating control means at times controls the heating of the cycle steam by the first reheating section to effect convergence of the signal representative of the generator end low pressure turbine section inlet steam temperature to the signal representative of the generator end low pressure turbine section inlet metal temperature.

22. An electric power plant according to claim 21 wherein at times when the signal representing the actual governor end low pressure turbine section exhaust metal temperature exceeds a predetermined level, the first reheating control means controls the heating of cycle steam by the first reheating section to effect convergence of the signal representative of the governor end low pressure turbine section exhaust metal temperature to said predetermined level.

23. An electric power plant according to claim 21 wherein at times when the signal representing the actual generator end low pressure turbine section exhaust metal temperature exceeds a predetermined value, the second reheating control means controls the heating of cycle steam by the second reheating section to effect convergence of the signal representative of the generator end low pressure turbine section exhaust metal temperature to said predetermined value.

24. An electric power plant according to claim 22 wherein at times when the power plant operation is above a predetermined load level, the first reheating control means control the heating of cycle steam by the first reheating section to effect convergence of the signal representative of the governor end low pressure turbine section inlet steam temperature to a first reference temperature signal.

25. An electric power plant according to claim 23 wherein at times when the power plant operation is above a predetermined load level, the second reheating control means controls the heating of cycle steam by the second reheating section to effect convergence of the signal representative of the generator end low pressure turbine section inlet steam temperature to a second reference temperature signal.

26. An electric power plant comprising:
means for generating cycle steam;
a steam turbine, said turbine including a high pressure turbine section and a plurality of low pressure turbine sections to conduct cycle steam therethrough, said low pressure turbine sections each including two-cycle steam inlets;

a first reheater unit coupled between said high pressure turbine section and one side inlet port of each of said plurality of low pressure turbine sections to reheat cycle steam exhausted from the high pressure turbine section and conducted therethrough and to manifoldly distribute said reheated steam to the one side inlet port of each of said low pressure turbine sections, said reheater unit integrally including first and second reheating sections for distributively heating cycle steam conducted through said first reheater unit;

a second reheater unit coupled between said high pressure turbine section and said other side inlet port of each of said plurality of low pressure turbine sections to reheat cycle steam exhausted from said high pressure turbine section and conducted therethrough and to manifoldly distribute said reheated steam to the other side inlet ports of each of said low pressure turbine sections, said reheater unit integrally including third and fourth reheating sections for distributively heating cycle steam conducted through said second reheater unit;

means to generate signals representative of actual temperature conditions for only a portion of said plurality of low pressure turbine sections;

a first control means governed by the temperature signals generated for one of said low pressure turbine sections to control said first and third reheating sections to distributively heat the cycle steam which is conducted through said first and second reheater units and manifoldly distributed respectively to said one and other inlet ports of each of said low pressure turbine sections; and, a second control means governed by the temperature signals generated for another of said low pressure turbine sections to control said second and fourth reheating sections to distributively heat the cycle steam which is conducted through said first and second reheater units and manifoldly distributed respectively to said one and other inlet ports of each of said low pressure turbine sections.

27. An electric power plant according to claim 26 including an electric generator, wherein said high pressure turbine section, plurality of low pressure turbine sections and electric generator are mounted on a single shaft to drive said electric generator; and wherein further the portion of the plurality of low pressure turbine sections include the low pressure turbine section adjacent to said electric generator and the low pressure turbine section adjacent to the high pressure turbine section.

28. An electric power plant in accordance with claim 27, wherein the first control means is governed by the temperature signals generated for the low pressure turbine section adjacent the high pressure turbine section; and, wherein the second control means is governed by the temperature signals generated for the low pressure turbine section adjacent the generator.

29. An electric power plant according to claim 26 including a heating steam source for providing heating steam to the two reheating sections of each of the first and second reheater units; and wherein the first and second control means controls the reheating of the cycle steam by the two reheating sections in each of the reheater units by regulating the amount of heating steam provided thereto.

* * * * *